C. I. HALL.
MAXIMUM INDICATOR FOR METERS.
APPLICATION FILED NOV. 29, 1911.

1,208,146.

Patented Dec. 12, 1916.
2 SHEETS—SHEET 1.

Witnesses:
Leonard W. Novander
Robert F. Bracke

Inventor
Chester I. Hall
By Brown & Williams
Attorneys

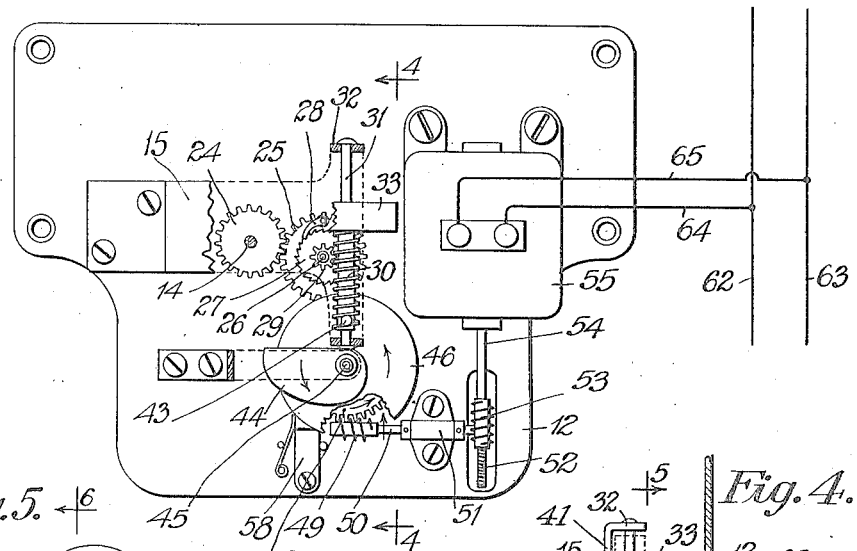

UNITED STATES PATENT OFFICE.

CHESTER I. HALL, OF CHICAGO, ILLINOIS, ASSIGNOR TO CHICAGO ELECTRIC METER COMPANY, OF CHICAGO, ILLINOIS, A CORPORATION OF ILLINOIS.

MAXIMUM-INDICATOR FOR METERS.

1,208,146.  Specification of Letters Patent.  Patented Dec. 12, 1916.

Application filed November 29, 1911. Serial No. 662,965.

*To all whom it may concern:*

Be it known that I, CHESTER I. HALL, a citizen of the United States, residing at Chicago, in the county of Cook and State of Illinois, have invented certain new and useful Improvements in Maximum-Indicators for Meters, of which the following is a full, clear, concise, and exact description, reference being had to the accompanying drawings, forming a part of this specification.

My invention relates to an improved form of maximum indicator for use in connection with instruments employed to measure the operation of meters in connection with which the indicator may be used. It is particularly adapted for use in connection with electricity meters which measure either the amount of current flowing through the circuit in a given time or the amount of power which is used in connection with the circuit to which the meter is connected.

By my invention, I employ, in connection with suitable indicating devices, mechanism which advances the devices as permitted by the operation of the meter with which the indicator is used, which mechanism is periodically re-set to its initial position by the mechanical operation of time-controlled devices. While it is immaterial what form of time-controlled mechanism is employed for the purpose of returning the indicator mechanism to its initial position at recurring intervals, I prefer to employ a constant speed motor for accomplishing this result, which motor, as it is caused to operate at constant speed, is effective in returning the mechanism to its initial position at definitely recurring instants of time and thus is in reality a time-keeping or controlled device.

Figure 1:
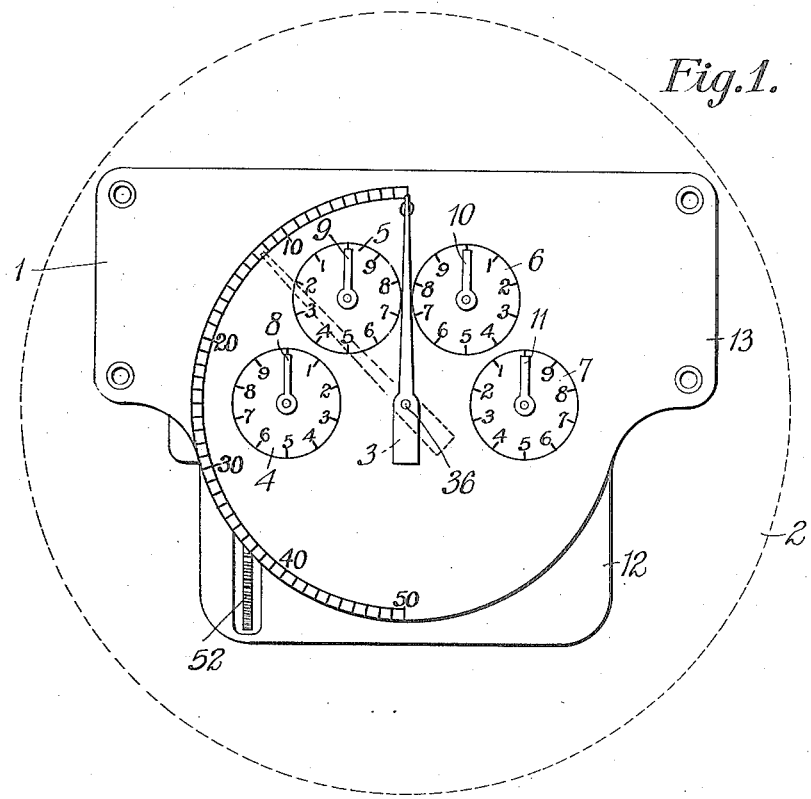
Figure 2:
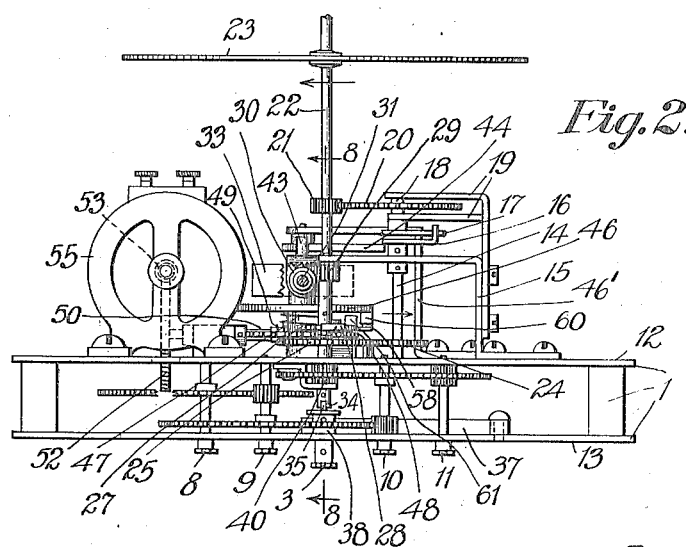

The several drawings illustrating my invention are as follows: Figure 1 shows in elevation the face of a maximum indicating attachment constructed in accordance with my invention. Fig. 2 is a top view of the mechanism shown in Fig. 1. Fig. 3 is a back view of the mechanism shown in Fig. 2 with the meter disk removed. Fig. 4 is a sectional view of the parts shown in Fig. 3 taken along the line 4—4. Fig. 5 is a detail view of some of the parts shown in Fig. 4 taken along the line 5—5, one of the disks being broken away to more clearly show the relation of the parts. Fig. 6 is a sectional view of the parts shown in Fig. 5 taken along the line 6—6. Fig. 7 shows in a view similar to Fig. 5 the operating parts in a reverse position to that shown in Fig. 5. Fig. 8 is a central longitudinal sectional view through the main shaft of the instrument taken along the line 8—8 in Fig. 2.

Similar numerals refer to similar parts throughout the several views.

As shown in Figs. 1 and 2, the maximum indicating attachment 1 is designed to be placed in front of a standard meter 2 and the maximum indicator, besides comprising an indicating hand 3 which remains in the position of maximum advance to which it may be moved, consists also of the integrating dials 4, 5, 6, and 7, having coöperating pointers 8, 9, 10, and 11, for showing at any time the total amount of operation of the meter with which the maximum indicator is used. The pointers 8, 9, 10 and 11 are connected to the outer ends of shafts supported in bearings formed in the plates 12 and 13, and the several shafts are geared together so that the pointers indicate the different orders of the total amount of operation of the meter, and the index as a whole is driven by a shaft 14 supported by the plate 12 and a bracket 15 secured to the rear face of said plate. The shaft 14 has formed on its rear end a crank 16 engaged by an arm 17 formed on the front end of a shaft 18, supported by bearings 19 secured to the bracket 15. The shaft 18 carries a gear 20 meshing with a pinion 21 carried by the shaft 22 of the meter.

In the drawings, the meter is taken as an integrating electricity meter and is shown provided with a retarding disk 23. The shaft 14 also carries a gear 24, meshing with a gear 25 loosely mounted upon the shaft 26. The shaft 26 has rigidly secured thereto a rigid wheel 27 engaged by a spring actuated pawl 28, pivoted to the gear 25. The shaft 26 has also secured thereto a pinion 29, engaged by a circular rack 30, mounted upon a rod 31 in such a manner that it may slide vertically upon said rod between the supporting ears of the bracket 32. A weight 33 is raised by the rack 30 and moved to its upper position to serve, when released, to in part drive the gearing connected with the shaft 26 to advance the indicating hand 3 in a manner to be described. The forward end of the shaft 26 has secured to it an arm 34 which engages a crank pin 35 carried by the rear end of the shaft 36 extending through the plate 13 of the casing of the maximum indicator. The forward end of the shaft 36 has secured thereto the pointer or hand 3. A flat spring 37 rests upon the under side of the collar 38 secured to the shaft 36, which collar carries the crank pin 35, such spring being provided to hold the hand 3 in any position to which it may be advanced when the shaft 26 and parts carried thereby are returned to their initial position by the raising of the rack 30. The gear 25 is secured to a sleeve 39, loosely mounted upon the shaft 26, and at its forward end the sleeve carries a pinion 40, which serves to drive the index gearing as indicated in Fig. 2.

The ears 32 supporting the rod 31 extend forwardly from the bracket 41 in the lower portion of which a slot 42 is formed to receive a pin 43 extending rearwardly from the rack 30. The outer end of the pin 43 lies in the path of a cam 44 mounted upon a shaft 45 rotatable in bearings formed in the plate 12 and bracket 46'. The front end of the shaft 45 carries a disk 46 to which one end of a spring 47 is secured. The other end of the spring 47 is secured to a worm-wheel 48 mounted so as to rotate freely upon the shaft 45 when operated by a worm 49 carried by a shaft 50 supported in a bearing 51 from the plate 12 of the framework of the indicator. The shaft 50 also has secured to it a worm-wheel 52 engaged by a worm 53, carried by the shaft 54 of a motor 55 mounted upon the plate 12.

The worm-wheel 48 has extending rearwardly from it a pin 56 which, as the worm-wheel is rotated by the operation of the motor 55, engages the cam surface 57 formed on the upper end of a spring dog 58, which is provided with a lug 59 normally engaging a lug 60 carried by the disk 46 to prevent rotation of the disk as the spring 47 is wound up by rotation of the worm-wheel 48. As the dog 58 is moved from its normal position by the operation of the pin 56, the lug 60 is released, and, under the action of the spring 47, the disk 46 and cam 44 are given nearly a complete rotation, thus bringing the lug 60 into the position indicated in Fig. 7, against a lug 61 formed on the dog 58. When the pin 56 is advanced sufficiently to permit the dog 58 to resume its normal position, under the action of the spring indicated, the lug 60 drops from the lug 61 into engagement with the lug 59 in which position it remains until the worm-wheel 48 is again moved through nearly a complete rotation to bring the pin 56 into engagement with the cam surface 57. As the pin 43 lies in the path of the cam 44, rotation of the cam as described raises the pin and the rack 30 connected therewith, as well as the weight 33, and this causes rotation of the shaft 26 and parts carried thereby back to their normal position without operating the sleeve 39 owing to the pawl and ratchet connection between the sleeve and the shaft 26.

The motor 55 is of a type that will operate at constant speed as, for example, a synchronous motor, or, if used in connection with direct current supply, a constant current constant speed motor. Whatever may be the particular type of motor employed, I propose to construct the motor so that the speed will be maintained constant, as a result of which at regularly recurring intervals the disk 46 will be disengaged from the stop-dog 58 and the cam 44 will move the rack 30 and the parts actuated thereby to their initial position, thus permitting the weight of the rack and the weight 33 to again actuate the parts as permitted by operation of the meter shaft 22.

As the construction of the constant current motor does not form a part of this invention, I do not here show such construction in detail, nor is the motor construction claimed in this application. As shown in Fig. 3, the motor may be supplied with current from mains 62 and 63, by means of conductors 64 and 65, so that if the source of supply is an alternating current source, and the motor employed is a synchronous motor, the speed of the motor will be maintained constant as long as the frequency upon the line is maintained at a fixed value and, on the other hand, if the main line be connected to a direct current source, the motor 55, by being constructed to operate at a constant speed for the constant impressed voltage, will operate at a uniform rate as long as the pressure on the mains is maintained uniform.

From the above description, it will appear that my maximum indicating attachment is self-contained; that is, it comprises, not only devices for indicating the maximum consumption of electricity or other quantity for any one of a number of successive time intervals, but the means employed for returning the actuating mechanism to its initial position is incorporated in the structure and operates directly and mechanically upon the indicator actuating mechanism and requires no winding at periodic intervals as would clockwork mechanism if the latter were employed.

While I have shown my invention in the particular embodiment herein described, I do not, however, limit myself to this construction, but may employ any equivalents that may suggest themselves to those skilled in the art.

What I claim is:

1. In an electricity meter, the combination of a meter element revoluble proportionally to the electricity measured, a device for indicating the electricity measured for a given interval, gearing between the revoluble element and the indicating device, a pawl and ratchet mechanism associated with the gearing, a rack adapted to move one element of the pawl and ratchet mechanism relatively to the other, a weight tending to move the rack to drive the pawl and ratchet mechanism and thereby the gearing, a cam for periodically moving the weight and rack to their initial position, a constant speed motor, gearing driven by the motor, mechanism between the cam and the motor gearing for storing the energy of rotation of the motor, and an escape mechanism actuated by the motor gearing for releasing the cam and communicating thereto the stored energy.

2. In an electricity meter, the combination of a meter element revoluble proportionally to the electricity measured, a device for indicating the electricity measured for a given interval, gearing between the revoluble element and the indicating device, a pawl and ratchet mechanism associated with the gearing, a rack adapted to move one element of the pawl and ratchet mechanism relatively to the other, a weight tending to move the rack to drive the pawl and ratchet mechanism and thereby the gearing, a cam for periodically moving the weight and rack to their initial position, and a constant speed motor for intermittently operating the cam.

3. In an electricity meter, the combination of a meter element revoluble proportionally to the electricity measured, a device for indicating the electricity measured for a given interval, gearing between the revoluble element and the indicating device, a pawl and ratchet mechanism associated with the gearing, a rack adapted to move one element of the pawl and ratchet mechanism relatively to the other, a weight tending to move the rack to drive the pawl and ratchet mechanism and thereby the gearing, and a constant speed motor for mechanically moving the weight and rack to their initial position at regularly recurring intervals.

4. In an electricity meter, the combination of a meter element revoluble proportionally to the electricity measured, a device for indicating the electricity measured for a given interval, gearing between the revoluble element and the indicating device, a pawl and ratchet mechanism associated with the gearing, a rack adapted to move one element of the pawl and ratchet mechanism relatively to the other, a weight tending to move the rack to drive the pawl and ratchet mechanism and thereby the gearing, and a constant speed motor for mechanically moving the weight and rack to their initial position at regularly recurring intervals without changing the position of the indicating device.

5. In an electricity meter, the combination of a meter element revoluble proportionally to the electricity measured, a device for indicating the electricity measured for a given interval, driving mechanism between the revoluble element and the indicating device, a pawl and ratchet mechanism associated with the driving mechanism, a device adapted to move one element of the pawl and ratchet mechanism relatively to the other, means tending to move the said device to drive the pawl and ratchet mechanism and thereby the elements of the driving mechanism, and means operating at a constant rate for mechanically moving the actuating device for the pawl and ratchet mechanism to its initial position at regularly recurring intervals.

6. In combination, a meter element revoluble proportionally to the electricity measured, an indicating device, driving mechanism between the aforesaid meter element and said indicating device, and means operating at a constant rate for mechanically returning a part of the driving mechanism to its initial position at regularly recurring intervals.

7. In combination, a meter, an indicating device, driving mechanism between the meter and the indicating device, and a constant speed motor for mechanically returning a part of the driving mechanism to its initial position at regularly recurring intervals.

8. In combination, an indicating device, means for driving the device, a cam for returning the driving means to its initial position at recurring intervals, a member having a constant rate of operation, mechanism between the cam and the member for storing the energy of operation of the member, and means for periodically communicating the stored energy to the cam.

9. In combination, an indicating device, means for driving the device at a rate proportional to the rate of operation of a meter, a member having a constant rate of operation, mechanism for storing the energy of operation of the member, and means for imparting the stored energy to the driving means at regularly recurring intervals to return a part of the driving mechanism to initial position.

10. In combination, a cam, a stop-dog for normally holding the cam against rotation, a shaft rotating at a constant rate, a spring between the shaft and the cam, and coöperating devices carried by the shaft and stop-dog for moving the stop-dog to its disengaging position to permit the spring to operate the cam.

11. In combination, a cam, a stop-dog for normally holding the cam against rotation, a shaft rotating at a constant rate, a spring between the shaft and the cam, and coöperating devices carried by the shaft and stop-dog for moving the stop-dog to its disengaging position to permit the spring to move the cam through one rotation.

12. In combination, a meter, an indicating device, driving mechanism between the meter and the indicating device whereby the indicating device is driven at a rate proportional to the rate of operation of the meter, and an electric motor for mechanically shifting a part of the driving mechanism to its initial position at regularly recurring intervals.

In witness whereof, I hereunto subscribe my name this 27th day of November, A. D. 1911.

CHESTER I. HALL.

Witnesses:
　ALBERT C. BELL,
　LEONARD E. BOGUE.